June 28, 1966    L. R. GLOSTEN    3,257,986
MARINE TOWING WARPABLE THRUST COUPLING Filed Jan. 5, 1965    10 Sheets-Sheet 1

INVENTOR.
LAWRENCE R. GLOSTEN
BY
Robert W. Beach
ATTORNEY

June 28, 1966 L. R. GLOSTEN 3,257,986
MARINE TOWING WARPABLE THRUST COUPLING
Filed Jan. 5, 1965 10 Sheets-Sheet 4

INVENTOR.
LAWRENCE R. GLOSTEN
BY
Robert W. Beach
ATTORNEY

June 28, 1966  L. R. GLOSTEN  3,257,986
MARINE TOWING WARPABLE THRUST COUPLING Filed Jan. 5, 1965  10 Sheets—Sheet 5

INVENTOR.
LAWRENCE R. GLOSTEN
BY
Robert W. Beach
ATTORNEY

June 28, 1966   L. R. GLOSTEN   3,257,986
MARINE TOWING WARPABLE THRUST COUPLING
Filed Jan. 5, 1965   10 Sheets-Sheet 6

INVENTOR.
LAWRENCE R. GLOSTEN
BY
ATTORNEY

June 28, 1966 L. R. GLOSTEN 3,257,986
MARINE TOWING WARPABLE THRUST COUPLING
Filed Jan. 5, 1965 10 Sheets-Sheet 7

INVENTOR.
LAWRENCE R. GLOSTEN
BY
Robert W. Beach
ATTORNEY

June 28, 1966 L. R. GLOSTEN 3,257,986
MARINE TOWING WARPABLE THRUST COUPLING
Filed Jan. 5, 1965 10 Sheets-Sheet 8

INVENTOR.
LAWRENCE R. GLOSTEN
BY
Robert W. Beach
ATTORNEY

June 28, 1966  L. R. GLOSTEN  3,257,986
MARINE TOWING WARPABLE THRUST COUPLING
Filed Jan. 5, 1965  10 Sheets-Sheet 9

INVENTOR.
LAWRENCE R. GLOSTEN
BY
Robert W. Beach
ATTORNEY

United States Patent Office 3,257,986
Patented June 28, 1966

3,257,986
MARINE TOWING WARPABLE THRUST COUPLING
Lawrence R. Glosten, Bainbridge Island, Wash., assignor to Sea-Link Incorporated, Vancouver, Wash., a corporation of Washington
Filed Jan. 5, 1965, Ser. No. 423,507
44 Claims. (Cl. 114—235)

This application is a continuation-in-part of United States patent application Serial No. 338,436, filed January 17, 1964, for Connecting Linkage for Watercraft.

This invention relates to a thrust coupling connecting a combination of vessels such as a tow and a tugboat in which the tow is forward of the tugboat and the coupling construction is such that the coupling can be swung and preferably also warped by such relative movement of the connected vessels as is not detrimental to the maintenance of proper control of one vessel over the other, such as the tugboat over the tow, for maintenance of a desired towing relationship between the vessels.

It has been customary heretofore for tugboats to tow vessels either by the tow being forward of the tugboat and being connected to it by a thrust coupling or by the tow being aft of the tugboat and connected to it by a hawser. In the former case the tugboat and the tow are close-coupled, whereas in the latter case the tow is separated from the tugboat by a substantial distance. The former type of relationship between the tugboat and tow has substantial advantages over the latter arrangement.

When the tow is ahead of the tugboat and connected to it by a thrust coupling, the tow is much more controllable by the coupling enabling the tugboat to turn the tow more quickly and through sharper angles and enabling the tugboat to stop the tow quickly and even reverse the movement of the tow if necessary. Moreover, the combination of the tugboat and tow connected by a thrust coupling is much more compact to enable the tugboat and tow to maneuver in close quarters. Also it is not necessary for the tugboat and tow to change relationship when leaving or approaching port. When the tow is connected aft of the tugboat by a hawser, it is necessary to shorten the towing line which is very time consuming and leaves the tow temporarily uncontrolled so that it is subject to being moved out of a desired position by wind, current or tide. Especially if a sea is running the control of a line-connected tow by the tugboat is more difficult, particularly during a line-shortening operation.

Moreover, a vessel towed aft of the tugboat connected by a line, particularly if the line is long, may encounter forces setting up a yawing oscillation. Skegs may be provided on the tow to resist displacement or sway, but such skegs increase the resistance to forward movement of the tow. Higher speeds of the tugboat and tow are therefore possible where the tow is ahead of the tugboat and connected to it by a thrust coupling. Moreover location of the tow ahead of the tugboat removes it from the wash of the propeller which produces additional resistance to movement of the tow. The operating efficiency of the tow and tugboat combination where the tow is ahead of the tugboat is thus greater and the operating cost is lower.

The combination of a tow ahead of the tugboat also is much safer than the combination of a tugboat with the tow trailing behind the tugboat and connected to it by a hawser. Particularly if the line is slack, it is subject to fouling and if it trails in the water additional resistance to movement of the combination is produced. Particularly at night or in fog the hawser between the tugboat and its tow cannot be seen and it is difficult to see such hawser at other times so that there is danger to ships traveling on an intersecting course. If the towline should be cut between the tugboat and the tow, the derelict tow immediately becomes a navigation hazard. Severe damage may be caused to a small boat encountering a heavy towline.

For these reasons it is very desirable for the tow to be located ahead of the tugboat and close-coupled to it, but in such relationship it is essential that the coupling between the tugboat and the tow be such as to enable the tugboat to maneuver the combination effectively. In the past the connection between the tugboat and the tow in such combination has been substantially rigid, which ordinarily is satisfactory for navigation on inland and completely protected waters. Such a connection for that combination is impractical, however, where the tow and tugboat must operate in a sea because the forces produced by a sea on the tugboat and tow when transmitted to the rigid connection or coupling would be so prohibitive as to rupture the coupling mechanism. Consequently, it has been the universal practice heretofore for the tow to be located aft of the tugboat and connected to it by a hawser in tugboat and tow combinations navigating in the open sea or in unprotected coastal waters.

Both the tow and the tugboat in a sea are subjected independently to forces of the wind, the waves and perhaps currents tending to make them pitch, heave, roll, yaw and/or sway. In pitching such a vessel alternately plunges and rises about its lateral axis. In rolling such a vessel rotates generally about its longitudinal axis. In heaving the vessel alternately rises and falls more or less without pitching and rolling. In yawing such a vessel will swing to one side or the other from its course. In swaying such a vessel is displaced sidewise back and forth. The forces produced on either vessel may cause a combination of any two or more of such motions in different degrees.

The principal object of the present invention is to provide a thrust coupling between a tow ahead of a tugboat and such tugboat which will be deformable in a manner and to an extent which will enable the tow and the tugboat or two tows to move relatively sufficiently to reduce greatly the stress on the coupling when such vessels are in a sea, yet which will enable the tugboat to maintain adequate control over the tow and to propel the tow effectively.

More specifically it is an object to provide a thrust coupling between a tow and a tugboat which will substantially restrain relative yaw, sway and longitudinal displacement of the tug and tow or of two tows coupled together while enabling such connected vessels to execute freely relative pitch and heave movements and more or less free relative rolling movements.

A further object is to provide a thrust coupling for connecting a tow and a tugboat or two tows in close-coupled relationship which is simple, compact and sufficiently rugged to withstand stresses produced by the tendency of the two vessels connected to move relatively in respects where it is desired to restrain completely or principally such types of relative movement, namely relative yaw, sway and longitudinal displacement.

A further object is to provide such a coupling which can be used in multiple vessel combinations including a tugboat and a plurality of tows.

Another object is to provide such a thrust coupling for connecting vessels which can be disconnected quickly from at least one of the vessels in case an emergency should arise.

The foregoing objects can be accomplished by a thrust coupling which is swingable by relative pitch and/or heave of the vessels which it connects and which is warpable by relative roll of the connected vessels and resists deformation from the tendency of the connected vessels to yaw or sway relatively. The coupling straddles the bow of the tugboat and includes a tapered frame at one side of the tugboat bow and a second frame or a strut at the opposite side of the tugboat bow. The frame may taper forward or aft, but preferably tapers aft and may include a dogleg chord adjacent to the tugboat bow if such bow is pointed and be of a contour generally complemental to the contour of such bow. Corresponding ends of the two coupling members are connected to one vessel and the other corresponding ends are connected to the other vessel or to a yoke which, in turn, is connected to such other vessel. The broad end or base of the tapered frame is pivoted to swing about a lateral axis and its tip is pivoted to swing at least about a lateral axis. Preferably also the vessel to which the tip is connected and such tip are relatively swingable about an upright axis and can swivel about a longitudinal axis. In the preferred form the other member of the coupling is a strut, the end of which corresponding to the broad end of the opposite frame is connected to the vessel by a universal joint and the opposite end of the strut is connected by a universal joint to the other vessel or a yoke to which the tip of the frame is connected. The tip of the frame and the corresponding end of the strut are preferably connected to the vessel or yoke by a quickly disconnectible connecting means or such a yoke is connected to the vessel by a quickly disconnectible connecting means. Such means may include two members of circular cross section in end abutment having matching flanges clamped together by an articulated ring including a shear-pin joint which can be parted readily and even by remote control in case of emergency.

Figure 1:
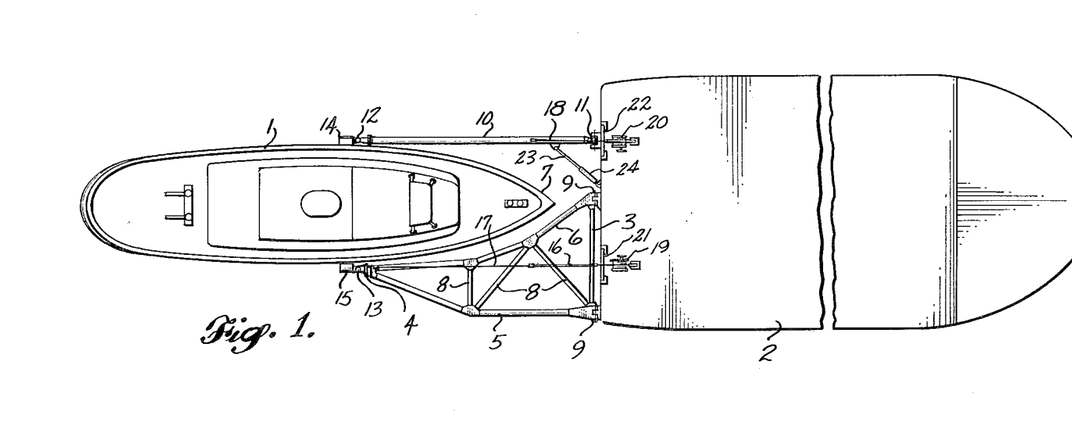
FIGURE 1 is a plan of a square stern barge tow and pointed bow tugboat combination in which the tow is forward of the tugboat and the vessels are connected by a coupling of the present invention and FIGURE 2 is a starboard side elevation of such combination.
Figure 2:
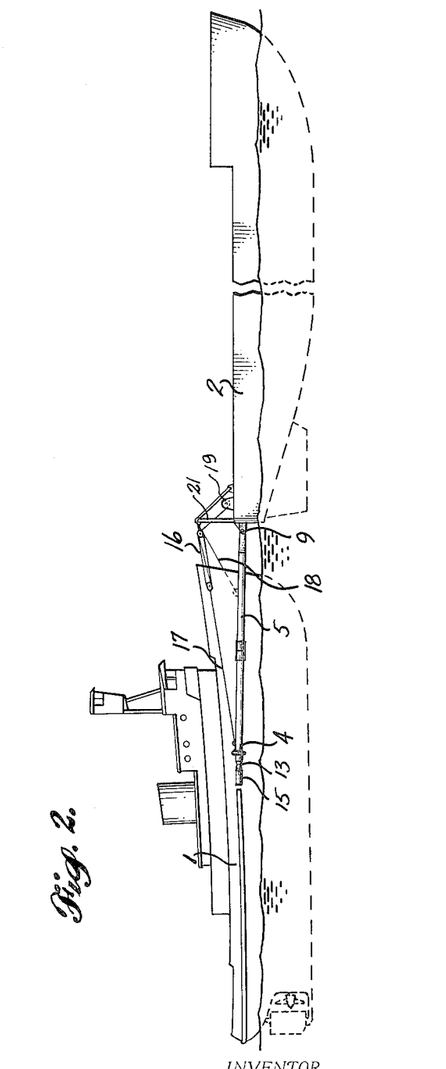

A preferred embodiment of the invention is illustrated in FIGURES 1 and 2 in which the coupling is shown connecting a tugboat 1 having a pointed bow with a tow forward of the tugboat in the form of a square-stern barge 2. In general, the coupling connecting these vessels includes two substantially parallel compression connecting members of substantially the same length and which are interposed between the two vessels. The opposite ends of such compression members are pivotally connected for swinging of each end of each member relative to the adjacent vessel at least about a lateral axis. A key feature of the coupling is that the pivot mounting of one end of one of the compression members limits the relative movement of such member end and the adjacent vessel to pivoting about a lateral axis.

In FIGURE 1 one of the compression members of the coupling connecting the vessels 1 and 2 is a frame tapered aft from its broad base 3 to its tip 4. Both the outer chord member 5 and the inner chord member 6 are of dogleg shape, the inner chord being of a shape generally complemental to the contour of one side of the pointed bow 7 of the tugboat. The chord members 5 and 6 are connected together by several braces 8 and such chord members, the base of the frame and the braces 8 are all disposed in coplanar relationship. Consequently, the frame is not deformable by relative movement of the members in the plane of such frame; but, on the contrary, such frame is of very rigid character.

The base of the frame is mounted by pivot means 9 the effective length of which, because of the rigidity of the frame, is the entire length of the frame base. Such elongated pivot means limit movement between the frame and the adjacent vessel 2 to swinging about a lateral axis. The other compression connecting member of the coupling is the strut 10, spaced from the frame member so that the coupling straddles the bow portion of the tugboat 1. The pivot connection 11 for the end of strut 10, corresponding to the pivot mounting 9 for the base of the frame, is substantially in alignment with the axis of such pivot mounting 9, but in this instance it is preferred that the pivot 11 enable the strut to swing relative to the adjacent vessel 2, not only about a lateral axis, but also about a vertical axis. Moreover, at least one end of the strut should swivel about a longitudinal axis.

Because the frame-connecting member and the strut-connecting member are preferably of approximately the same length, their aft ends will be disposed substantially in registry transversely of the tugboat. Such aft ends are pivotally connected for swinging relative to the tugboat at least about a lateral axis and preferably each of these compression member ends is also capable of swinging at least to a limited degree about an upright axis and of swiveling about a longitudinal axis. It may be said, therefore, that the aft strut end pivot means 12 and the aft frame tip pivot means 13 should be universal joints so as to enable each compression connecting member end, except that mounted by pivot means 9, to move universally. The aft pivot means 12 and 13 are mounted on the opposite sides of the tugboat 1 by attachments 14 and 15, respectively, which preferably are located approximately amidships of the tugboat.

In operation the frame- and strut-connecting members of the thrust coupling are disposed in substantially coplanar spaced parallel relationship when the tugboat 1 and the barge tow 2 are riding on an even keel. With the frame and strut in coplanar relationship, the pivoted mountings of opposite ends of the coupling swing relative to the tugboat 1 and the tow 2 as the tugboat and the tow heave and/or pitch independently of the other vessel. While, as the barge pitches, its stern will rise and fall to a considerable extent, thus raising and lowering correspondingly the forward end of the coupling, the elevational change of the aft end of the coupling will be considerably less because, with the attachments 14 and 15 located approximately amidships, the pitching of the tugboat will occur generally about a lateral axis joining the attachments 14 and 15 which will be located close to the center of buoyancy of the tugboat.

Although each of the vessels connected by the coupling can heave and pitch freely relative to the other vessel without restraint by the coupling, such vessels cannot yaw or sway relatively because of the restraint imposed on them by such coupling. Since the pivot means 9 can move only about a lateral axis, the spacing of the frame tip from the longitudinal central axis of the tow 2 cannot vary. Moreover, because of the elongated character of the pivot means 9 and the great rigidity of the tapered frame, such frame cannot be readily deformed by any force acting on the frame tip transversely of the longitudinal axis of the tow. Consequently, when the frame tip is secured by the attachment 15 to the side of the tugboat 1, the two vessels are secured together against relative sway.

It would be possible theoretically to construct the connection between the frame tip and the tugboat so that the tugboat could not yaw relative to the frame and, because the frame cannot be swung about an upright axis relative to the barge 2, such an arrangement would prevent relative yawing of the tugboat and the barge. From a structural point of view, however, it is more practical to provide the generally parallel connecting member arrangement shown in FIGURE 1 by utilization of the strut 10 connected to the opposite side of the tugboat to prevent it from yawing relative to the frame and, consequently, relative to the barge 2. The type of coupling shown in FIGURES 1 and 2 will, therefore, prevent relative yaw and sway of the connected vessels while not inhibiting independent pitch and heave of such vessels.

If the vessels connected by the coupling shown in FIGURES 1 and 2 should attempt to roll relative to each other about a longitudinal axis, forces would be produced in the coupling tending to twist the opposite connecting members relative to each other or, in other words, relative roll tends to warp the plane of the members. No warp occurs as long as the lateral axes of the connected vessels are parallel irrespective of changes in the relative elevations of such axes caused by pitch or heave of either or both of the vessels. It is the angular displacement of the lateral axes of the vessels resulting from relative roll of such vessels and the length of the coupling which determine the amount of warping of the coupling from planar condition which must be accommodated to avoid stresses being produced in such coupling.

The principal effect of relative roll of the vessels 1 and 2 is to produce swiveling forces in the connecting members. If the joint 13 connecting the frame to the tugboat can swivel about a longitudinal axis, therefore, the stresses which otherwise would be produced in the frame by relative rolling of the vessels will be greatly reduced. It is, of course, necessary for the joint 13 also to guide the tugboat 1 and the frame for relative swinging about a lateral axis in order to accommodate relative pitch and/or heave of the vessels. Similarly, if the joint 12 provides swiveling of the strut relative to the tugboat about a longitudinal axis, the stress in the strut which would otherwise be produced by relative rolling of the vessels will be greatly decreased. Again it is necessary for the joint 12 also to provide for relative swinging of the strut and the tugboat about a transverse axis in order to accommodate pitch and/or heave which may accompany relative rolling of the vessels. Such swivel joints would not, however, relieve completely the stresses to which the frame and strut would be subjected by relative roll of the vessels.

As the two connecting members are twisted relatively by relative roll of the vessels, simple swiveling of the joints 11, 12 and 13 will not eliminate all stress in the connecting members. The center of tilt of the tugboat is at the joint 13. If it is assumed for purposes of discussion that the frame remains stationary as the vessels roll relatively, the joint 12 carried by strut 10 will swing in an arc about joint 11. Such swinging will cause the horizontal projection of the distance between joints 12 and 13 to be reduced somewhat, which would require at least the joint 11 to be capable of guiding the strut 10 for swinging about an upright axis. Also such relative twisting of the connecting members would tend to cause some longitudinal relative displacement of the joints 12 and 13, but such displacement would be small.

The production of excessive stresses in the coupling connecting the vessels 1 and 2 resulting from their relative roll, therefore, can be avoided by the joint 13 affording at least a reasonable degree of swinging of the tugboat relative to the tip of the frame in any direction, enabling each of the joints 11 and 12 to provide limited universal swinging of the ends of the strut 10 relative to the respective vessels to which they are connected, and the joint 13 and at least one of the joints 11 and 12 providing swiveling about a longitudinal axis to a reasonable degree. Making pivot means 9 for the base of the frame of elongated type will reduce the concentration of stress resulting from the tendency of the two vessels to sway relatively for effecting relative lateral displacement of the vessels will produce insufficient stresses in the coupling for the coupling to be required to provide enough flexibility to avoid the production of such stresses in the coupling members.

It is preferred that the connecting members of the coupling shown in FIGURES 1 and 2 be mounted on the stern of the tow 2 and that the aft ends of such members be disconnectible from the tugboat generally at the joints 12 and 13 in order to separate the vessels. The connecting members can then be swung upward about their pivots relative to the barge and either secured in a position with their aft ends raised above their forward ends or in upright position or swung forward onto the deck if the supporting joints are located and constructed to permit such manipulation.

In FIGURES 1 and 2 tackle 16 for swinging upward the aft ends of the connecting members is shown which includes a line 17 attached to the tip end of the frame and a line 18 connected to the strut 10 at a location spaced from the joint 11. Such tackle may include power winches 19 and 20 for hauling the lines 17 and 18 and such tackle can be anchored to a frame or post 21 and 22 for the respective connecting members to elevate the pulling ends of the tackle.

As has been discussed previously, the frame cannot swing about an upright axis and, consequently, when a lifting force is applied by the tackle to the tip 4 of the frame, such frame will swing upwardly about the axis of transverse pivot 9. When the aft end of the strut 10 is disconnected from the tugboat 1 and a lifting force exerted on it by the line 18, however, the aft end of the strut can swing to port or to starboard without restraint because of the universal joint 11 within the limit of swing permitted by such joint. Such swinging of the strut in one direction or the other may be effected by the direction in which the lifting force is applied to it unless special provision is made for controlling the transverse swinging of the strut.

Figures 6, 7, 8, 9:
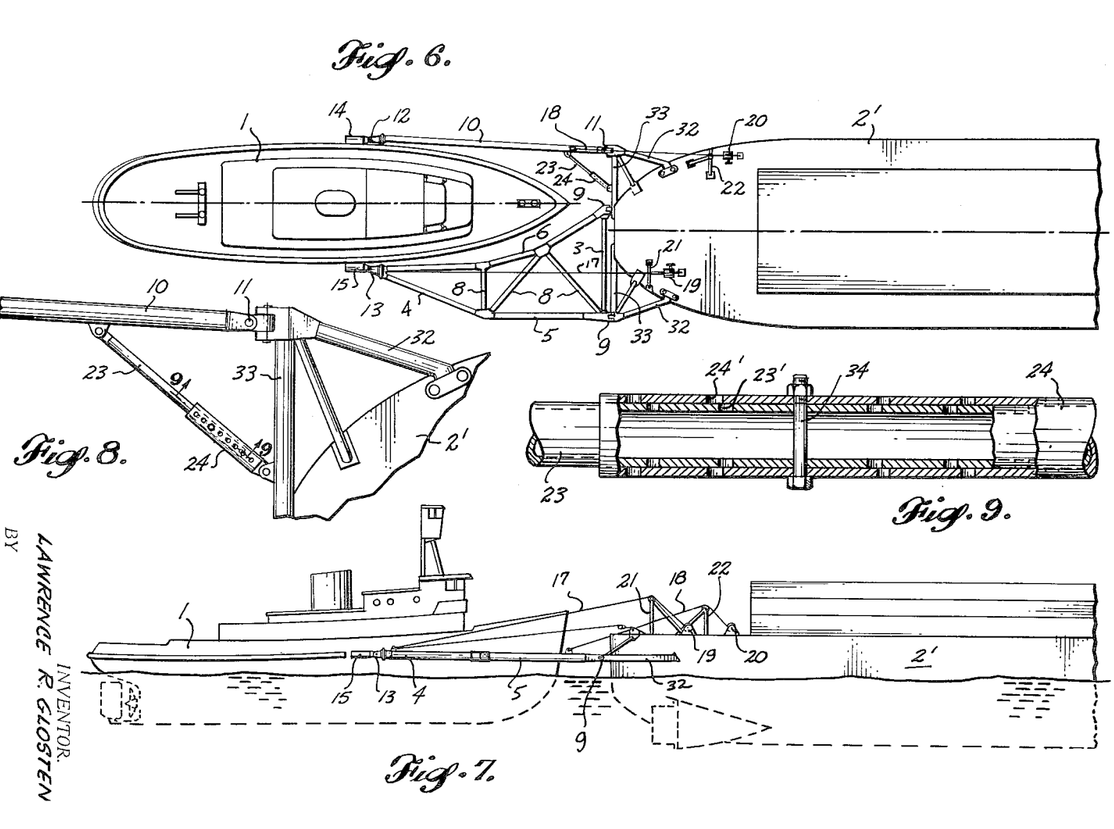
FIGURE 6 is a plan of a rounded stern barge tow and pointed bow tugboat combination with the tow forward of the tugboat connected by a coupling of the type shown in FIGURES 1 and 2 attached to the outriggers on the tow stern and FIGURE 7 is a starboard side elevation of such combination.
FIGURE 8 is a fragmentary detail plan of a forward port portion of the coupling and FIGURE 9 is a fragmentary detail elevation of a portion of such coupling structure having parts broken away along the line 9—9 of FIGURE 8.

In FIGURE 1 a diagonal bar is shown bridging between the barge 1 and the strut 10, which is shown as including an inner rod 23 telescoping into a sleeve 24, which parts normally are freely slidable to enable the diagonal bar to be adjusted automatically in effective length as the strut 10 is swung. When its aft end is disconnected from the tugboat 1, however, such rod and sleeve can be connected positively so as to provide a rigid triangular structure composed of the diagonal bar, the spacing on the barge and the spacing on the strut between the joint 11 and the connection of the diagonal bar with the strut. Such diagonal bar ties the strut against transverse swinging of its aft end so that, when a lifting force is transmitted by the line to the strut, such strut can be swung stiffly upward without transverse deflection of its aft end. Details of such diagonal bar are shown in FIGURES 8 and 9 and will be described below.

Figures 3, 4:
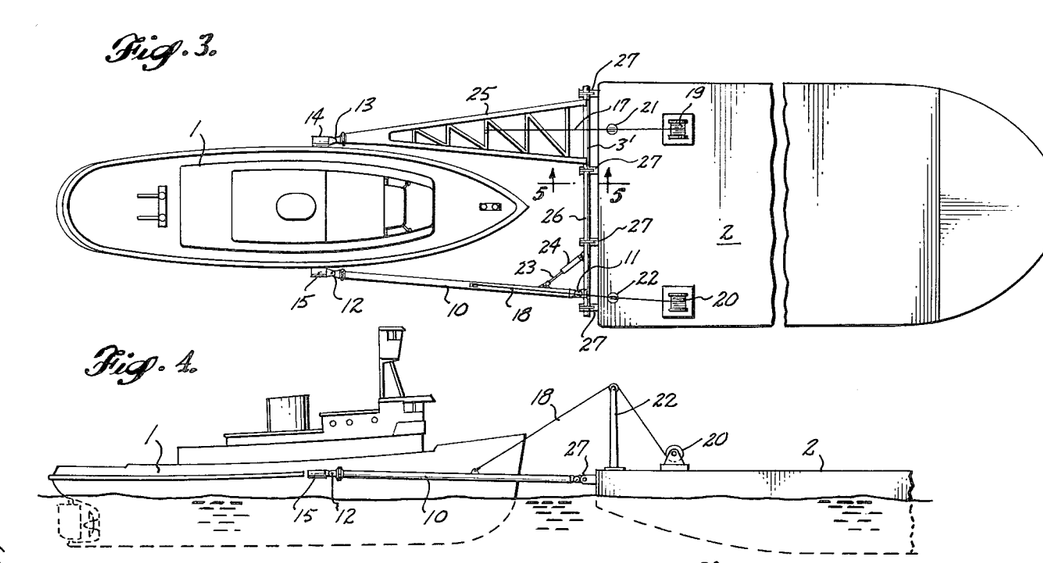
FIGURE 3 is a plan of a square stern barge tow and a pointed bow tugboat combination with the tow ahead of the tugboat and the vessels connected by a coupling according to the present invention of a type different from that shown in FIGURES 1 and 2 and FIGURE 4 is a starboard side elevation of the combination.

The vessels shown in FIGURES 3 and 4 are of the same type and arrangement as the tugboat 1 and the barge tow 2 in FIGURES 1 and 2. In this instance the tapered frame thrust connecting member of the coupling is of substantially isosceles triangle configuration and it is located on the port side of the tugboat rather than on its starboard side. Correspondingly, the strut 10 in the arrangement of FIGURES 3 and 4 is located on the starboard side of the tugboat instead of on the port side, as shown in FIGURES 1 and 2. It is evident, therefore, that the locations of the frame and strut compression connecting members are interchangeable from side to side. Also it will be noted that the strut 10 is shown in FIGURE 3 as being somewhat inclined forwardly and outwardly from the side of the tugboat 1, but it is still considered that such strut is substantially parallel to the frame 25.

In the construction shown in FIGURES 3 and 4 the base of the frame 25 is not pivoted directly to the stern of the barge 2, nor is the forward end of the strut 10 directly connected to the barge stern. On the contrary, the corresponding forward ends of the two compression connecting members are connected by a yoke bar 26 to which such connecting member ends are pivoted or which yoke bar forms part of the pivot structure. The yoke bar then, in turn, is rigidly, although removably, connected to the square stern of the barge by the brackets 27, one of which is shown in detail in FIGURE 5.

Figure 5:
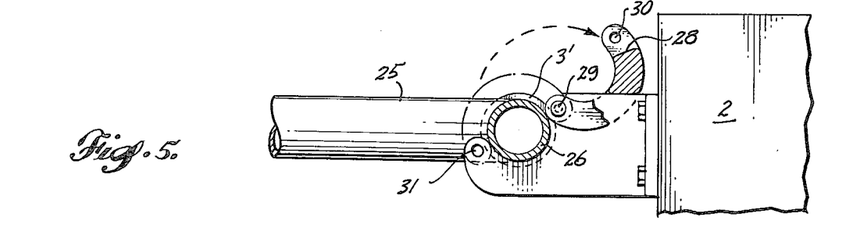
FIGURE 5 is a fragmentary detail elevation taken on line 5—5 of FIGURE 3.

FIGURE 3 shows the yoke bar as fitting in cradling sockets in several of the brackets 27 distributed in spaced registry across the stern of the barge. The yoke bar 26 is shown in FIGURE 5 as being of circular cross section, preferably tubular, so that it can turn in the sockets of the brackets 27 which could serve as the pivot means having a lateral axis about which the frame 25 and strut 10 can swing. The yoke bar can be secured in the brackets by swingable latch fingers 28, having one end secured to one side of the socket in each instance by a pivot 29. The swinging end of the latch finger has in it an aperture 30 which will be disposed in registry with the aperture 31 in the bracket at the opposite side of the socket when the latch finger is closed. A securing device can extend through the aligned apertures 30 and 31 to secure the latch fingers in yoke bar-holding position.

Instead of the yoke bar 26 turning in the brackets 27, the base of the tapered frame 25 may be a tube 3' through which the yoke bar extends to provide a long bearing for the base tube of the frame. Also the forward end of the strut 10 can be connected to the yoke bar by a universal joint 11, described in connection with FIGURES 1 and 2, located adjacent to the yoke bar but independent of it. The aft ends of the frame 25 and strut 10 can be connected to attachments 14 and 15 on the opposite sides of the tugboat, respectively, by universal joints 12 and 13, also described in connection with FIGURES 1 and 2. When the aft end of the strut is disconnected from the tugboat side, transverse swinging of such aft end can be restrained by the diagonal bar 23, 24 extending between the yoke bar 26 and the strut.

The operation of the thrust coupling shown in FIGURES 3 and 4 is essentially the same as the operation of the thrust coupling shown in FIGURES 1 and 2 described above. Attachment of the tugboat 1 to the trailing end of the frame 25 will restrain relative yaw and sway movements of the tugboat and the tow 2 because of the rigid construction of the frame and the mounting of its base 3' so that it can turn only about a lateral axis. Since the other three joints 11, 12 and 13 connecting the other ends of the compression members of the coupling are universal joints, the coupling will enable the tugboat 1 and the tow 2 to pitch, heave and roll with little or no restraint while the cooperation of the frame 25 and strut 10 prevents relative yaw and sway of the vessels. As described in connection with the coupling shown in FIGURES 1 and 2, tackle is also provided for the coupling connecting members shown in FIGURES 3 and 4 including the lines 17 and 18, the winches 19 and 20 and the posts 21 and 22 for raising and supporting the aft ends of the frame and strut when the aft ends of the connecting members are disengaged from the tugboat. During such lifting of the strut, the diagonal bar 23, 24 will stiffen it against transverse swinging of its aft end.

While the frame 25 and strut 10 can be handled in the above manner if their aft ends are disconnected from the tugboat, it is also possible to disengage the yoke bar 26 from the supporting brackets 27 to sever the means connecting the two vessels by unfastening the latch fingers 28 without disrupting the structure of the universal joint 11 itself. By applying a lifting force from the bow of the tugboat 1 or even from the lines 17 and 18 connected to the yoke bar, such yoke bar can be lifted bodily out of the sockets in brackets 27. Thereafter the yoke bar can either be supported from the tugboat or can be lowered onto a float so that the lines 17 and 18 can be disconnected from the frame and strut to enable the barge 2 to be removed and another barge of the same or different type substituted for it. It is evident, therefore, that the coupling mechanism can normally be equipment of the tugboat or of the tow, or, with the type of construction shown in FIGURES 3 and 4, the latch fingers 28 holding the yoke bar 26 can be released and the aft ends of the frame 25 and strut 10 can be disengaged from the tugboat 1 so that the entire coupling can be removed from both vessels.

In FIGURES 6 and 7 the form of coupling utilized to connect the tugboat 1 and the barge tow 2' is the same as illustrated and described in connection with FIGURES 1 and 2. In this instance, however, the barge 2' has a rounded stern instead of a square stern like the barge 2 of FIGURES 1 and 2. For distributing the application of the pushing propulsive force by the tugboat to the tow, therefore, the base 3 of the frame and the forward end of the strut 10 are pivotally connected to outrigger brackets 32 projecting from stern quarters of the barge both laterally and rearwardly to provide transverse mounting bars 33 to which the elongated pivot means 9 at the base of the frame, the universal joint 11 at the forward end of the strut 10 and the diagonal bar 23, 24 are anchored.

Again the operation of the coupling construction shown in FIGURES 6 and 7 will be similar to that described in FIGURES 1 and 2 and, when the coupling mechanism is disengaged from the tugboat 1, the aft ends of the thrust connecting members can be raised as described by the tackle and winches in the manner previously explained. Details of the outrigger construction and strut connection are shown more clearly in FIGURES 8 and 9. The forward end of strut 10 is shown as connected to the mounting bar 33 by a universal joint 11 of cross-pivot type, although it may be desirable to utilize a universal joint of the ball-and-socket type in some instances. When the aft end of the strut is connected to the tugboat attachment 14, the rod 23 of the diagonal bar will slide freely in the tube 24. When the aft end of the strut is to be disconnected from the tugboat, however, the length of the diagonal bar will be fixed by inserting a bolt 34 through registering holes 23' in rod 23 and 24' in sleeve 24. As seen in FIGURE 9, the spacing of holes 23' is different from the spacing of holes 24' so as to provide a length adjustment of the diagonal bar in small increments over a large length adjustment range.

Figure 10:
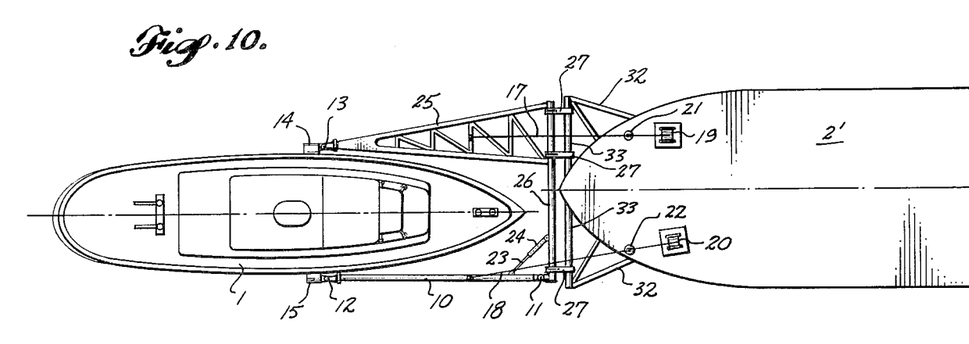
FIGURE 10 is a plan of a rounded stern barge tow and pointed bow tugboat combination with the tow forward of the tugboat and with the vessels connected by a coupling generally of the type shown in FIGURES 3 and 4 having the forward portion of the coupling attached to outriggers and FIGURE 11 is a starboard side elevation of such combination.
Figure 11:
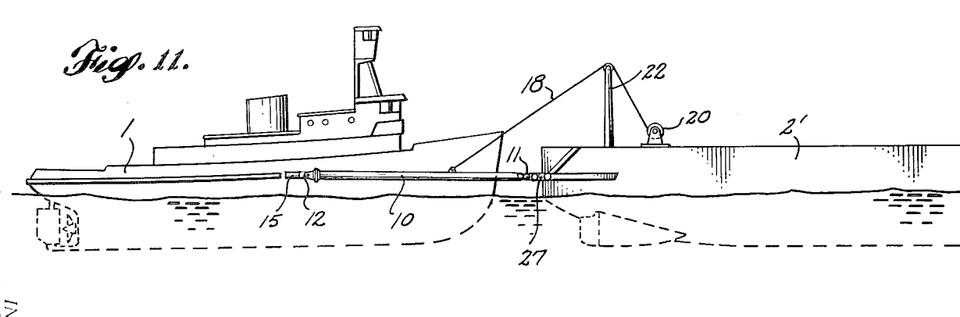

The tugboat 1 and barge 2' shown in FIGURES 10 and 11 are the same as the tugboat and tow shown in FIGURES 6 and 7, the barge having a rounded stern from which outrigger brackets 32 project to provide support for the coupling mounting bars 33. The coupling mechanism itself is like that shown in FIGURES 3 and 4 including the triangular frame 25 tapered aft and the strut 10, the forward ends of which are connected by the yoke bar 26. Such yoke bar, in turn, is supported in brackets 27, as described with reference to FIGURES 3, 4 and 5. The operation of the barge and tow combination equipped with this type of coupling will, therefore, be understood from the previous description.

Figure 12:
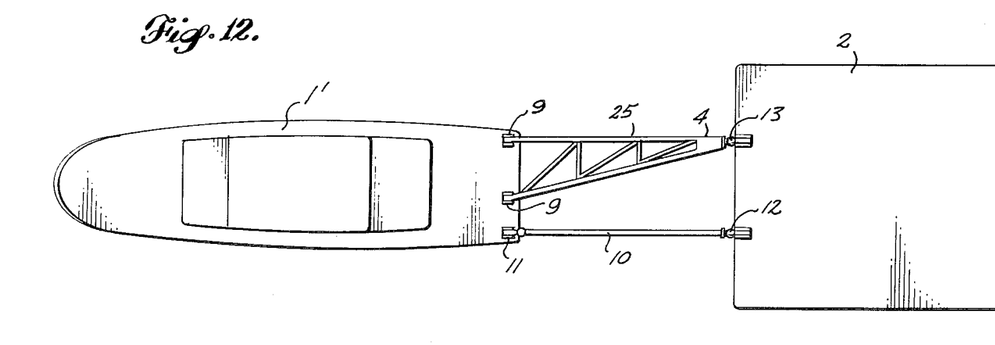
FIGURE 12 is a plan of a square stern barge tow and a square bow tugboat combination connected by a coupling of the present invention and FIGURE 13 is a similar view of a similar combination in which the coupling is slightly modified.

While, in each of the coupling arrangements described above, the base of the tapered frame has been forward and the tip of such frame has been aft, the frame 25 in FIGURE 12 has been reversed end for end with respect to the tugboat and the tow. In this instance the tugboat 1' has a square bow instead of a pointed bow and the tow is a square stern barge. The base of the frame 25 is connected by elongated pivot means 9 to the bow of the tugboat and the forward tip 4 of the frame is connected by a universal joint 13 to the square stern of the barge 2. The aft end of strut 10 is connected by universal joint 11 to the bow of the tugboat 1' and the forward end of such strut is connected by the universal joint 12 to the square stern of the barge 2. Again the two thrust connecting members 25 and 10 are disposed in substantially parallel arrangement spaced apart transversely.

Figure 13:
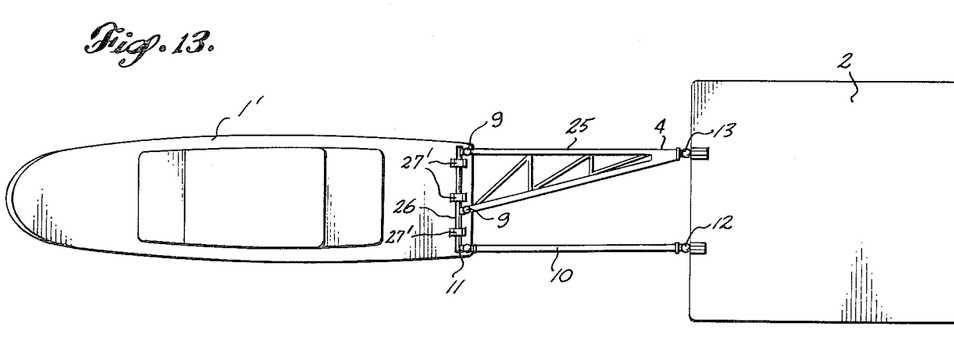

The vessels and coupling of FIGURE 13 are like those of FIGURE 12 except that the base of the frame and the aft end of strut 10 are interconnected by yoke bar 26 which is secured to the bow of tug 1' by brackets 27'. These brackets can be like brackets 27 in FIGURES 3, 4 and 5. The orientation of the frame and strut as shown in FIGURE 13 is also the same as in FIGURE 12, but the compression thrust members could be reversed end for end with yoke bar 26 mounted on barge 2. Alternatively, the mountings for joints 12 and 13 alone could be connected by a yoke bar, or the corresponding ends of both compression thrust members could be connected by yoke bars detachably mounted on the respective vessels.

Figures 14, 15, 16:
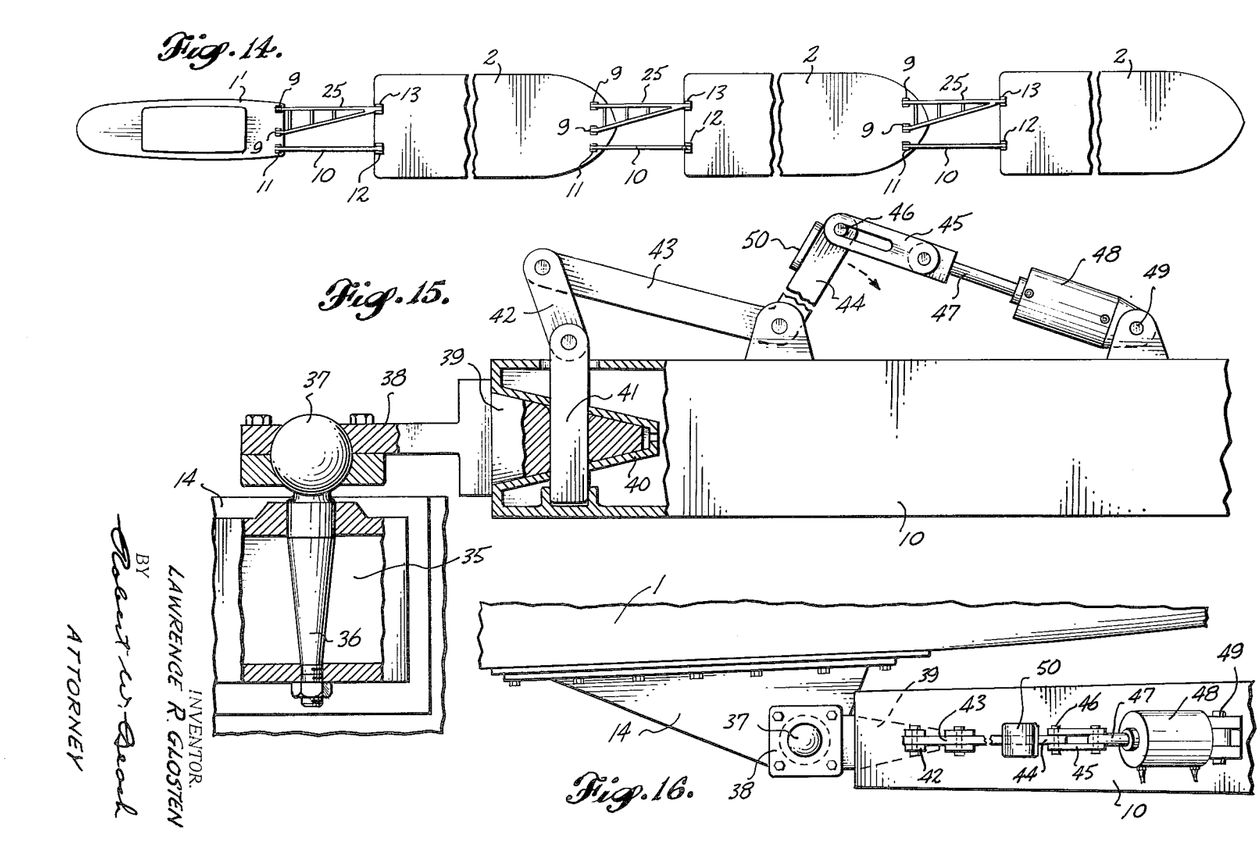
FIGURE 14 is a plan of a combination of a string of vessels including several tows and a tugboat, adjacent vessels being connected by couplings of the type shown in FIGURE 12.
FIGURE 15 is a side elevation of quick-disconnect mechanism which can be incorporated in a coupling of the present invention, parts being broken away.
FIGURE 16 is a plan of the mechanism shown in FIGURE 15.

The forward ends of frame 25 and strut 10 shown in each of FIGURES 12 and 13 can be disengaged from the barge 2 and suitable tackle can be provided on the tugboat 1' for raising and supporting the forward ends of these thrust connecting members. Alternatively, by unlatching the brackets 27', the entire coupling mechanism can be removed from the tugboat 1' of FIGURE 13 without disrupting the universal joint 11 adjacent to the yoke bar 26. In FIGURE 14 the same type of tugboat 1' as in FIGURES 12 and 13 is shown, but in this instance a string of barges 2' is illustrated constituting the tow for the tugboat. The adjacent ends of adjacent vessels in each instance are connected by a coupling including a frame 25 and a strut 10 of the type shown in FIGURE 12 and described with respect to this figure. In each instance the base of the frame is connected to one vessel by elongated pivot means 9; the tip of the frame is connected to the other vessel by a universal joint 13; and the opposite ends of the strut 10 are connected to the two vessels by universal joints 11 and 12.

As has been mentioned, the universal joints 11, 12 and 13 can be of the cross-pivot type or of the ball-and-socket type. In FIGURES 15 and 16 a ball-and-socket type of universal joint is shown which can be used to connect either an end of the strut 10 to an attachment 14 on the side of the tugboat such as shown in FIGURES 3 and 4 or this type of universal joint can be used to connect the tip 4 of a tapered frame to an attachment 15 on the side of a tugboat, as shown in FIGURE 1. In addition to the universal joint mechanism itself shown in FIGURES 15 and 16 the connection combination includes disengageable parts separate from and independent of the universal joint but adjacent to it and connected to it, disengagement of which parts free the end of the thrust connecting member from the vessel to sever the connection between the two vessels, either for purposes of substituting one vessel for another or in case of emergency without disrupting the structure of the universal joint itself.

The representative universal joint and the adjacent disengageable mechanism shown in FIGURES 15 and 16 include the attachment 14 which is bolted or otherwise suitably secured to the side of the tugboat 1. Such attachment has a socket 35 receiving the tapered shank 36 of a support for a ball 37. A ball-embracing fitting 38 is carried by a tongue 39 preferably of conical cross section which fits contiguously in a socket 40. A latch pin 41 connected by a link 42 to one arm 43 of a bell crank can be inserted through registering openings or apertures in the tongue 39 and in the socket 40 to secure the tongue and socket against inadvertent separation.

To the other arm 44 of the bell crank is connected a slotted link 45 by a pin 46 received in such slot and such link is secured to the plunger 47 of a fluid pressure jack 48 mounted swingably by a pivot 49 on the end portion of the strut 10 adjacent to the socket 40. When it is desired to disconnect the end of the strut from the vessel attachment, the fluid pressure jack 48 can be actuated to retract its plunger 47 for swinging the upright arm 44 of the bell crank. Such swinging of the bell crank raises arm 43 which pulls link 42 upward to withdraw the latch pin 41 from the registering apertures of the tongue 39 and socket 40. Because of the tapered shape of the tongue 39 and socket 40, such tongue can be withdrawn easily from the socket when it is thus unlatched so as to disengage the strut end from the attachment while leaving the universal joint 37, 38 intact.

In case of emergency or failure of a supply of fluid under pressure for the jack 48, an anvil 50 on the upper end of bell crank arm 44 can be struck by a sledge hammer to swing the bell crank for withdrawing the latch pin 41 from the tongue and socket apertures as described. During such swinging of arm 44, pin 46 will simply slide along the slot of link 45 without the necessity of effecting movement of such link. When the strut end has thus been disconnected from the attachment 14, the strut can be lifted by tackle as described in connection with FIGURE 1.

Figure 17:
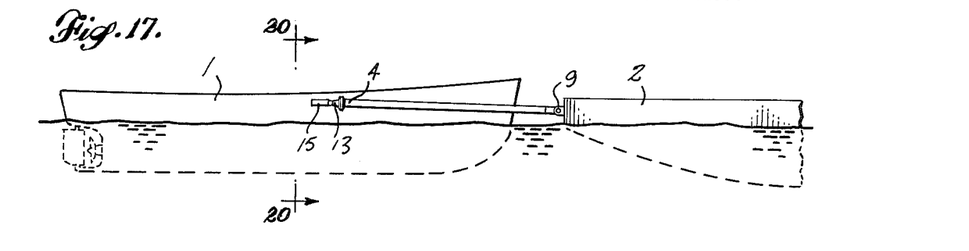
FIGURES 17, 18 and 19 are somewhat diagrammatic starboard side elevations of the combination of a tow barge and tugboat with the tow forward of the tugboat and connected by a coupling of the present invention illustrating relative pitching of the vessels which must be accommodated by the coupling
Figure 18:
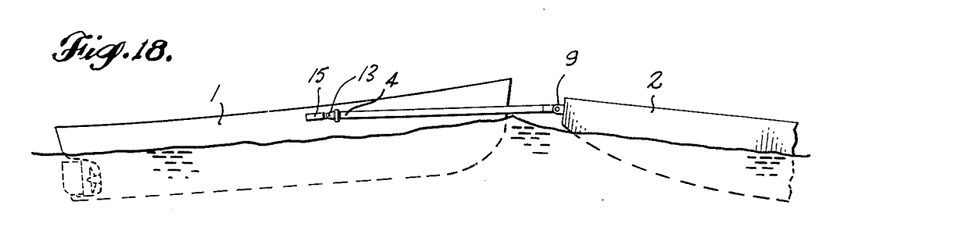
Figure 19:
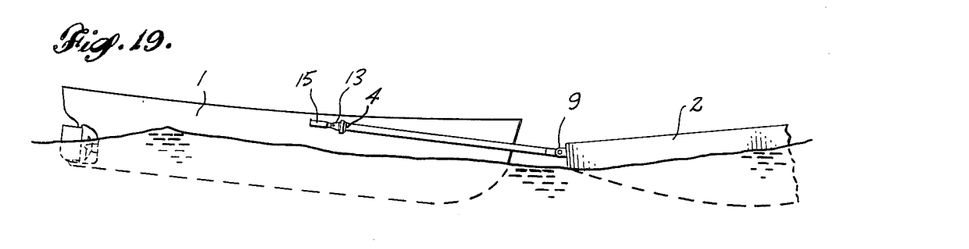
Figure 20:
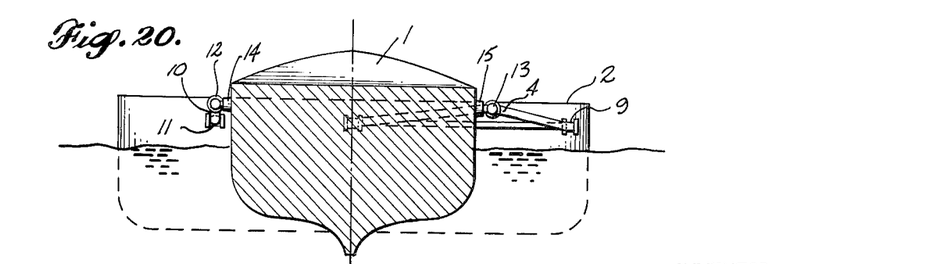
FIGURE 20 is a vertical section through the tugboat of the combination taken on line 20—20 of FIGURE 17.

FIGURES 17 to 24 inclusive illustrate the operation of coupling mechanism of the type shown in FIGURES 1 and 2, for example, in diagrammatic form and suggest the type of operation of the other modifications of the coupling mechanism illustrated and described above. From these diagrams it will be appreciated that even under severe conditions the degree of relative swinging between the vessels and the connecting members is not great so that the ball-and-socket type of universal joint shown in FIGURES 15 and 16 will afford an adequate range of movement. FIGURE 17 shows that when the two vessels, such as the tugboat 1 and barge tow 2, are on an even keel the two compression connecting members of the coupling are disposed coplanar. Moreover, such coplanar relationship is maintained when the vessels pitch relatively, such as by the bow of the tow plunging and the bow of the tugboat rising, as shown in FIGURE 18. The two connecting members of the coupling continue to maintain such coplanar relationship when the two vessels pitch in the opposite senses, such as by the bow of the tow 2 rising and the bow of the tugboat 1 plunging, as shown in FIGURE 19. FIGURE 20 shows clearly that under these circumstances the lateral axes of the tugboat and the tow are in parallel relationship.

Figure 21:
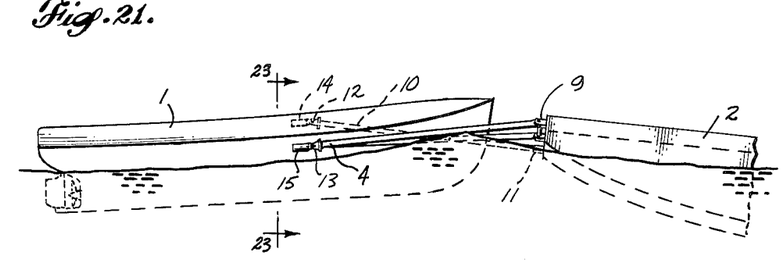
FIGURES 21 and 22 are somewhat diagrammatic starboard side elevations of a tow and tugboat combination with the tow forward of the tugboat connected by a coupling of the present invention illustrating relative combined pitch, heave and rolling motions of the tow and tugboat which the coupling can accommodate by deformation.
Figure 22:
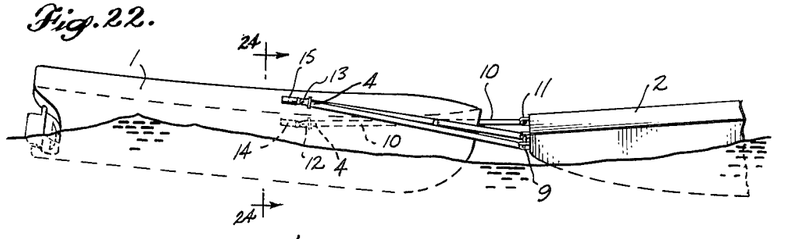
Figure 23:
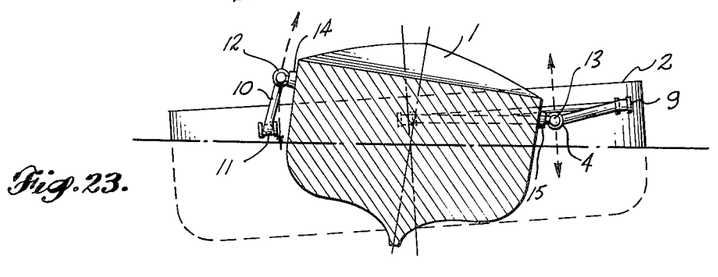
FIGURE 23 is a vertical section through the tugboat on line 23—23 of FIGURE 21 showing the combination and FIGURE 24 is a vertical section through the tugboat along line 24—24 of FIGURE 22 showing the combination.
Figure 24:
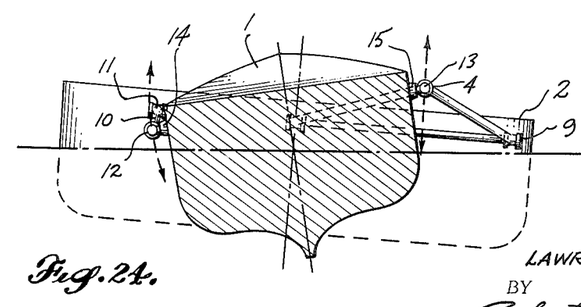

In FIGURES 21 to 24 the vessels are illustrated as both pitching and rolling. Thus the type and degree of pitching of the tugboat 1 and tow 2 shown in FIGURE 21 is generally the same as that shown in FIGURE 18, but in addition the tugboat is shown as rolling or heeling to starboard, whereas the tow is rolling or heeling to port. FIGURE 22 shows the tugboat and the tow pitching generally in the same way and to approximately the same degree as shown in FIGURE 19, but in addition the tugboat is shown as rolling or heeling to port while the tow is rolling or heeling to starboard.

Combined rolling and pitching relative movements of the tugboat and the tow generally of the type illustrated by FIGURES 21 to 24 will produce the most severe deformation or warping from planar condition of the thrust connecting members of the coupling as shown in these figures. It will be noted particularly that the connection of the tugboat to the tip 4 of the rigid frame will prevent relative sway of the tugboat and the tow so that the relative rolling of the tugboat and tow will occur about the universal joint 13 connecting the frame tip to the attachment 15 as a center. This characteristic of the coupling is indicated by the broken-line directional arrows shown in FIGURES 23 and 24, indicating that the universal joint 12 will traverse an arc the center of which is the joint 13, as the coupled vessels roll relatively.

While from a consideration of FIGURES 21 to 24 and the description of the coupling structures given above it will be appreciated that it is desirable for three of the four joints connecting a vessel and a compression connecting member end, namely joints 11, 12 and 13, to be of the universal joint type, it is not essential that all of such joints be universal joints. Actually, as mentioned above and as will be evident from FIGURES 23 and 24, the aft end of the strut 10 tends to move transversely of the longitudinal axis of the vessel combination only to a small degree. Consequently, except under conditions where relative roll occurs to a great degree, it is feasible to substitute a joint swinging about a single axis in place of the universal joint 11 shown in the various couplings described above. Such a modification is illustrated in FIGURES 25 and 26.

Figure 25:
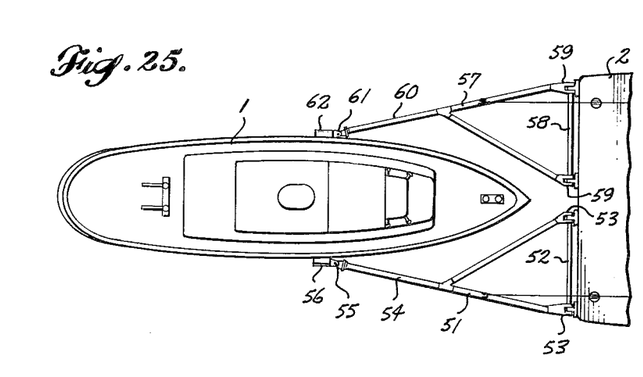
FIGURE 25 is a plan of the stern portion of a square stern barge tow and a pointed bow tugboat combination with the tow forward of the tugboat connected by a coupling of modified type utilizing principles of the present invention and FIGURE 26 is a starboard side elevation of the stern portion of the tow and the bow portion of the tugboat of FIGURE 25.
Figure 26:
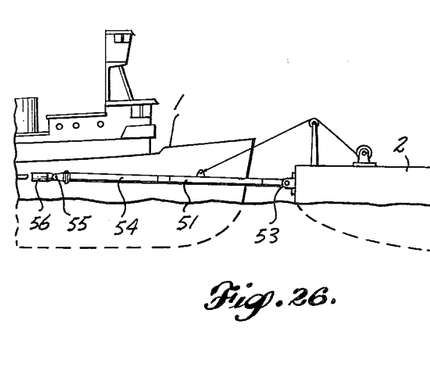

The coupling between the tugboat 1 and the square stern barge tow 2 shown in FIGURES 25 and 26 utilizes two composite frame and strut units which are mirror images. Thus the starboard composite connecting member includes a forward frame portion 51 having a base 52 swingably mounted by elongated pivot means 53 on the stern of the barge 2. Projecting rearwardly from this frame is the strut element 54 connected by a universal joint 55 to an attachment 56 secured to the starboard side of the tugboat. Correspondingly, the port connecting member includes the forward frame portion 57 having the base member 58 which is connected by the elongated pivot means 59 to the port side of the stern of the barge 2. The strut element 60 projects rearwardly from the frame portion 57 and its aft end is connected by the universal joint 61 to the attachment 62 secured to the port side of the tugboat 1.

It will be seen that the frame portions 51 and 57 of the coupling shown in FIGURES 25 and 26 swing conjointly in coplanar relationship as the tugboat 1 and tow 2 pitch or heave relatively. Moreover, these two frame portions can swing differentially, one up and one down, when the tugboat and tow roll relatively in the manner indicated in FIGURES 23 and 24. The universal joints 55 and 61 will also permit swiveling as well as swinging of the aft ends of the struts 54 and 60 relative to the tugboat. Relative roll of the tugboat and tow will, however, in addition tend to produce some variation in spacing of the joints 55 and 61 as compared to the forward ends of the struts 54 and 60 attached to the tips of the frames 51 and 57. The members 54 and 60 may, therefore, be sufficiently resilient so that the stresses produced in them will cause them to bend slightly without damage.

Figure 27:
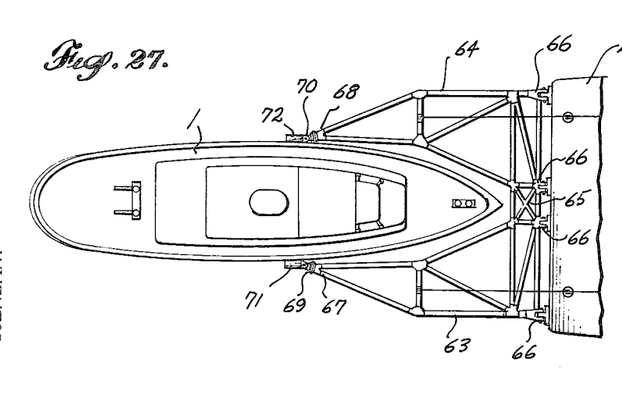
FIGURE 27 is a plan of the stern portion of a square stern barge tow and a pointed bow tugboat combination with the tow forward of the tugboat connected by a coupling of still a different type utilizing principles of the present invention and FIGURE 28 is a starboard side elevation of the stern portion of the tow and the bow portion of the tugboat of FIGURE 27.
Figure 28:
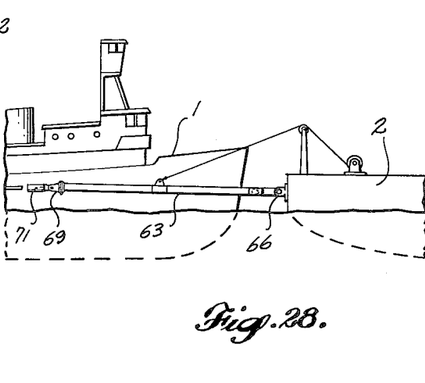
Figure 29:
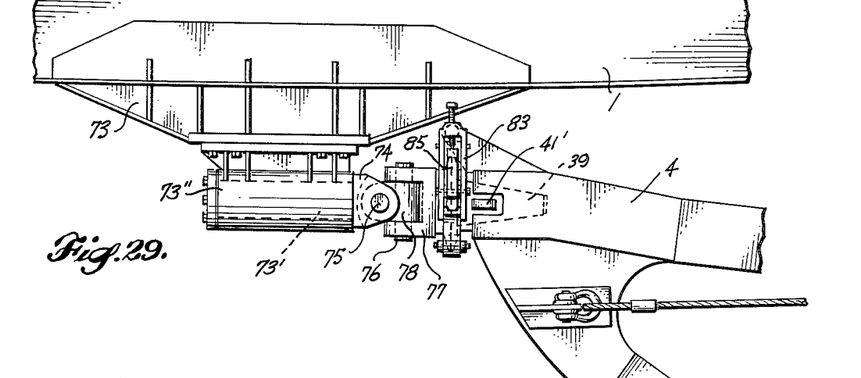
FIGURE 29 is a detail plan of the connection between one end of a connecting member of the coupling and vessel attachment providing a quickly disconnected joint and FIGURE 30 is a side elevation of such connection.
Figure 30:
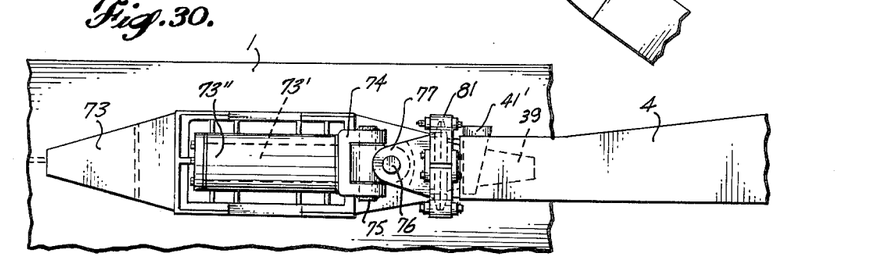

As suggested by the type of coupling construction shown in FIGURES 27 and 28, two frames generally of the type shown in FIGURE 1 could be used as the respective compression connecting members of the coupling, one at the starboard side and the other at the port side of the tugboat 1. Because such frames would be more rigid than the composite frame and strut members shown in FIGURES 25 and 26, the connection between the vessels would be more rigid. In the construction shown in FIGURES 27 and 28, a starboard frame 63 and a port frame 64 generally of the same type as the frame shown in FIGURE 1 are interconnected by a bridging truss 65 so as to integrate the two frame members into a rigid coupling unit. Such unit is attached to the stern of the barge 2 by the elongated pivot means 66 extending virtually across the entire transom of the barge. The starboard tip 67 of this composite frame and the port tip 68 of such frame are connected by universal joints 69 and 70, respectively, to attachments 71 and 72, respectively, secured to opposite sides of the tugboat 1.

In operation the composite frame structure 63, 64 will always maintain substantially a planar condition, so that while such frame can be swung freely relative to both vessels during their relative pitch and heave movements, as illustrated in FIGURES 18 and 19, for example, relative roll of the vessels such as portrayed in FIGURES 21 to 24 would be almost completely restrained. Because of the tendency of such vessels to roll relatively, it will, therefore, be necessary to make the frame components 63 and 64 and the truss component 65 of the coupling shown in FIGURE 27 of quite rugged construction.

The aft ends of the couplings shown in FIGURES 25 to 28 can be disconnected from the tugboat attachments, as has been discussed in connection with previous modifications. After such disconnection of the couplings, they can be swung upward by applying to them lift forces exerted by tackle and winches shown in these figures which is similar to such tackle described in connection with FIGURES 1 and 2, for example.

It will be understood that the various types of coupling structures discussed above can be used for connecting vessels of different sizes and shapes and, consequently, the particular design configuration and sizes and strengths of the connecting members will differ depending upon the particular application of the coupling in each type of situation. It is, of course, desirable for the couplings to be as light as possible, compatible with adequate strength. A desirable type of construction, therefore, utilizes tubular struts and frame components. Preferably such components are sealed and are sufficiently large as compared to their weight so that both the frames and the struts are sufficiently buoyant to float. Also, it will be understood that various designs of joints can be used to provide sufficient strength at stress concentration points while affording the required freedom of movement.

Figures 31, 32, 33:
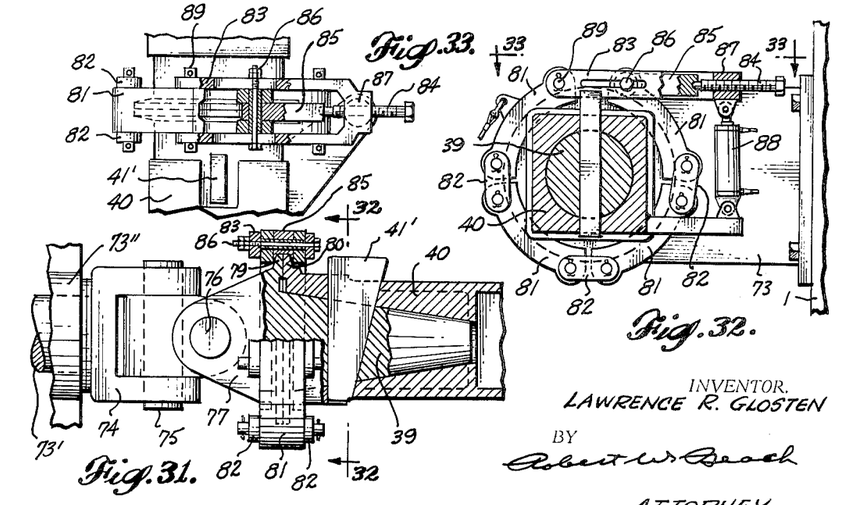
FIGURE 31 is an enlarged detail elevation of a portion of the connection shown in FIGURE 30
FIGURE 32 is a section through such detail taken on line 32—32 of FIGURE 31.
FIGURE 33 is an enlarged fragmentary plan of a portion of the connection viewed from line 33—33 of FIGURE 32, parts of which are broken away.

A preferred type of cross-pivot universal joint and disengageable connection combination is shown in FIGURES 29 to 33 inclusive. Such structure includes the attachment 73 which is secured to the side of a vessel, such as the tugboat 1. On this attachment swivel rod 73' received in sleeve 73" carries yoke 74 mounting one pivot 75 of a universal joint. The other pivot 76 is carried by the yoke 77 and the offset cross-fitting 78 connects the two pivots 75 and 76. The disengageable connection adjacent to the universal joint but separate from it is interposed between and connected to the universal joint yoke 77 and the frame tip 4. This connection includes the tapered tongue 39 engaged in the socket 40 of complemental shape. These two connection parts are secured in interengaged relationship by a latch pin 41' of wedge shape which extends through registering flaring apertures in the tongue 39 and socket 40, as shown in FIGURE 31. This latch pin must be removed if it is desired to enable the parts of the connection to be disengaged quickly in case of emergency so as to sever the connection between the two vessels.

In addition to or instead of relying upon the wedging latch pin 41' to hold the tongue 39 and socket 40 of the connection in engagement, the tongue element of the connection includes an annular flange 79 disposed in face-to-face abutment with a complemental annular flange 80. Such flanges are held in such abutment by an articulated clamping ring encircling them. Such ring is composed of several arcuate segments 81, four being shown in FIGURE 32, the adjacent ends of which are connected by short links 82 guiding such clamping ring segments for relative swinging. At one location in the annulus of the clamping ring, the adjacent ends of adjacent ring segments 81 are connected by a ring-tensioning link 83 which is adjustable in effective length by turning the adjusting screw 84 engaged with a lug 85 provided on the end of one of the arcuate segments 81.

One of the pivot pins 86 of the tension-adjusting link 83 is of sufficiently weak material or is sufficiently small to constitute a shear pin. If the nut 87 in which the ring-tension adjusting screw 84 is threaded is raised by the fluid pressure jack 88, the tension-adjusting link 83 will be swung about its pivot 89 which will shear the pivot pin 86 and thereby effect an immediate severance of the continuity of the clamping ring. Such clamping ring will then simply fall from its clamping engagement with flanges 79 and 80 so that, if the latch pin 41' has previously been removed, the tongue 39 can be pulled easily from the socket 40 to disengage the frame tip 4 from the attachment 73.

While preferred detail structures have been shown and described above, it will be understood that the principle of the present invention may be utilized in coupling structures of quite different types within the scope of this invention.

I claim as my invention:

1. A thrust coupling closely connecting two vessels comprising a compression connecting member, means connecting one end of said compression connecting member to one of said vessels, guiding said compression connecting member for swinging relative to such vessel about a lateral axis and limiting swinging of such member relative to such vessel to movement about such lateral axis, means connecting the other end of said compression connecting member to the other vessel and guiding such other end of said connecting member and such other vessel for relative swinging about a lateral axis, and means restraining relative yawing movement of such other vessel and such other end of said compression connecting member.

2. The thrust coupling defined in claim 1, in which the last means includes a second compression connecting member connected to such other vessel and located spaced from and generally parallel to the first compression connecting member.

3. The thrust coupling defined in claim 1, in which the compression connecting member is a tapered frame, and the means connecting one end of said frame to one of the vessels includes elongated pivot means connecting the base of such frame to such vessel.

4. The thrust coupling defined in claim 1, in which the compression connecting member is a tapered frame, the means connecting one end of said frame to one of the vessels includes elongated pivot means connecting the base of such frame to such vessel, and the last means includes a second compression connecting member connected to such other vessel and disposed in spaced substantially parallel relationship to said frame.

5. The thrust coupling defined in claim 1, in which the means connecting the other end of the compression member to the other vessel guides the other end of the connecting member for rolling of such other vessel relative to the connecting member as well as guiding such connecting member end and such other vessel for relative swinging about the lateral axis.

6. The thrust coupling defined in claim 1, in which the other vessel is a tugboat and the means connecting the other end of the compression connecting member to such tugboat is attached to the side of the tugboat amidships.

7. A thrust coupling closely connecting two vessels comprising two elongated compression connecting members of substantially the same length extending lengthwise in generally parallel spaced relationship between the vessels, means mounting said connecting members and connecting them to the vessels including pivot means guiding corresponding ends of said connecting members for swinging relative to the vessels about generally parallel lateral axes, and means limiting swinging of one end of one of said connecting members to movement about a single lateral axis relative to the adjacent vessel.

8. The thrust coupling defined in claim 7, in which the two compression connecting members straddle the end of one of the vessels, and corresponding ends of the two compression connecting members are attached to opposite sides of such vessel at a location spaced a substantial distance from its end straddled thereby.

9. The thrust coupling defined in claim 8, in which the vessel straddled by the connecting members is a tugboat and corresponding ends of such straddling compression connecting members are attached to the opposite sides of the tugboat, respectively, substantially amidships.

10. The thrust coupling defined in claim 7, in which the means limiting swinging of one end of one of the connecting members to movement about a single lateral axis relative to the adjacent vessel includes elongated pivot means, the axis of which pivot means is such single lateral axis.

11. The thrust coupling defined in claim 10, in which such one connecting member is a tapered frame, and the elongated pivot means is connected to the base of said frame.

12. The thrust coupling defined in claim 11, and a yoke bar connecting the elongated pivot means and the pivot means guiding the corresponding end of the other connecting member.

13. The thrust coupling defined in claim 12, and means mounting the yoke bar on the end of one of the vessels.

14. The thrust coupling defined in claim 11, and means mounting on one of the vessels the elongated pivot means and the pivot means guiding the corresponding end of the other connecting member.

15. The thrust coupling defined in claim 11, in which the other connecting member is a strut having universal joint means at its opposite ends.

16. The thrust coupling defined in claim 11, in which the other connecting member is a second tapered frame and the pivot means connected to the base of said second tapered frame are elongated pivot means.

17. The thrust coupling defined in claim 16, in which both frames are of rigid truss construction.

18. The thrust coupling defined in claim 16, in which at least one of the frames includes an elongated flexible member remote from the base of the tapered frame and mounted by a universal joint.

19. The thrust coupling defined in claim 11, in which one of the vessels is a tugboat having a sharp bow, the tapered frame extends alongside the tugboat with its base forward, means attaching the tip of the frame to the side of the tugboat at a location a substantial distance aft of its bow, and the chord of the frame adjacent to the tugboat is of dogleg shape generally complemental to the bow portion of the tugboat.

20. The thrust coupling defined in claim 7, in which universal joints are connected to the other end of such one connecting member and both ends of the other connecting member.

21. The thrust coupling defined in claim 20, in which the universal joints are of the ball-and-socket type.

22. The thrust coupling defined in claim 20, in which the universal joints are of the cross-pivot type.

23. In a thrust coupling closely connecting two vessels, a compression strut, mounting means supporting one end of said compression strut from one vessel and guiding such strut for swinging relative to such vessel about more than one axis extending transversely of its length, and angular brace means interconnecting such vessel and a portion of said strut spaced lengthwise of said strut from said mounting means and operable to restrict swinging of said strut relative to such vessel to swinging about a single axis through said mounting means extending transversely of the length of said strut.

24. In the thrust coupling defined in claim 23, the angular brace means including two elongated members having their lengths disposed in overlapping relationship and movable relatively to vary the effective length of the brace means to enable the strut to swing relative to the vessel about more than one axis extending transversely of the strut length, and securing means engageable with said elongated members for restraining relative lengthwise movement thereof for restricting swinging of the strut relative to the vessel to swinging about a single axis through the mounting means extending transversely of the length of the strut.

25. Connecting mechanism connecting a first watercraft and a second watercraft comprising:
 (a) a pushing frame and a steering bar connecting the two watercraft;
 (b) said pushing frame and steering bar being in spaced relationship;
 (c) said pushing frame having two spaced legs;
 (d) each of said legs having a hinged connection with the first watercraft permitting the frame to move relative to such watercraft only in a swinging manner about an athwartships axis;
 (e) said pushing frame being connected to the second watercraft with connecting means which allow said pushing frame both to swing about an athwartships axis and to swivel about an axis generally parallel to its length relative to the second watercraft;
 (f) and said steering bar being connected to both the first and second watercraft with connecting means which allow both pitching and rolling relative movements of the watercraft.

26. The connecting mechanism defined in claim 25, in which the pushing frame is of hollow tubular watertight construction.

27. The connecting mechanism defined in claim 25, in which the first watercraft is positioned to push the second watercraft.

28. The connecting mechanism defined in claim 25, in which the first watercraft is positioned to be pushed by second watercraft.

29. The connecting mechanism defined in claim 28, in which the pushing frame has its two spaced legs on one end, and linking means on its other end.

30. Connecting mechanism connecting a first watercraft and a second watercraft comprising:
 (a) an elongated first connecting member connecting together the first and second watercraft;
 (b) an elongated second connecting member connecting together the first and second watercraft;
 (c) said first and second connecting members being in spaced relationship;
 (d) said first connecting member being connected to one of the watercraft by means which permit relative movement between said first connecting member and said one of the watercraft only in a swinging manner about an athwartships axis and being connected to the other watercraft by means which allow said first connecting member both to swing about an athwartships axis and to swivel about an axis generally parallel to the length of said first connecting member relative to the other of said watercraft;
 (e) and said second connecting member being connected to one of the watercraft by means which permit relative movement between such second connecting member and said one of the watercraft only in a swinging manner about an athwartships axis and being connected to the other watercraft by means which allow said second connecting member both to swing about an athwartships axis and to swivel about an axis generally parallel to the length of said second connecting member relative to the other of said watercraft.

31. Connecting mechanism connecting a first watercraft and a second watercraft comprising:
 (a) two spaced pushing frames;
 (b) each pushing frame including two legs and a base connecting corresponding ends of said two legs;
 (c) said base of each pushing frame being connected to one of the watercraft by means which permit said pushing frame both to swing about an athwartships axis and to swivel about an axis generally parallel to the length of said frame relative to such watercraft;
 (d) and each leg being connected to one of the watercraft at a location remote from said frame base by means which permit such leg only to swing about an athwartships axis relative to such watercraft.

32. The connecting mechanism defined in claim 31 in which the first watercraft is positioned to push the second watercraft.

33. Connecting mechanism connecting a first watercraft and a second watercraft comprising:
 (a) two spaced pushing frames;
 (b) each pushing frame including an elongated main member having two legs at one end;
 (c) the main member of each pushing frame being connected to one of the watercraft by means which permit said main member both to swing about an athwartships axis and to swivel about an axis generally parallel to the length of said main member relative to such watercraft;

(d) and each leg being connected to one of the watercraft by means which permit such leg only to swing about an athwartships axis relative to such watercraft.

34. The connecting mechanism defined in claim 33, in which the first watercraft is positioned to push the second watercraft.

35. The combination of
(a) a first watercraft;
(b) a second watercraft,
(c) said first watercraft being positioned to push said second watercraft;
(d) a pushing frame connecting said first watercraft and said second watercraft;
(e) a steering bar connecting said first watercraft and said second watercraft;
(f) said pushing frame and said steering bar being in spaced relationship;
(g) said pushing frame having on one end two spaced legs and on the other end linking means;
(h) said two spaced legs having connecting means which allow swinging of said legs relative to said first watercraft about an athwartships axis and which restrict swinging of said legs relative to said first watercraft about an upright axis;
(i) said linking means on the other end of said pushing frame allowing movement between said first watercraft and said second watercraft;
(j) and said steering bar having linking means on each end which allow movement between said steering bar and said watercraft.

36. The combination of
(a) a first watercraft;
(b) a second watercraft;
(c) said first watercraft being positioned to push said second watercraft;
(d) a pushing frame connecting said first watercraft and said second watercraft;
(e) a steering bar connecting said first watercraft and said second watercraft;
(f) said pushing frame having on one end two spaced legs and on the other end linking means;
(g) each of said legs having a hinged connection to said first watercraft which permits said frame to swing only about an athwartships axis relative to said second watercraft;
(h) said linking means being connected to said second watercraft to allow said pushing frame both to swing about an athwartships axis and to swivel about an axis generally parallel to its length relative to said second watercraft;
(i) and said steering bar being connected to both said first and second watercraft with connecting means which allow both pitching and rolling relative movements of said watercraft.

37. Connecting mechanism connecting a first watercraft, a second watercraft and a third watercraft, the first watercraft being positioned to push the second watercraft and the second watercraft being positioned to push the third watercraft, said connecting mechanism comprising:
(a) a first connecting member and a second connecting member in substantially parallel spaced relation connecting together the first and second watercraft;
(b) and a first connecting member and a second connecting member in substantially parallel spaced relationship connecting together the second and third watercraft;
(c) said two first connecting members allowing relative pitching between the first and second watercraft and between the second and third watercraft and deterring relative yawing between the first and second watercraft and between the second and third watercraft;
(d) and said two second connecting members allowing both relative rolling and pitching between the first and second watercraft and between the second and third watercraft.

38. The combination of
(a) a first watercraft;
(b) a second watercraft;
(c) a third watercraft;
(d) said first watercraft being positioned to push said second watercraft;
(e) said second watercraft being positioned to push said third watercraft;
(f) connecting means comprising a first connecting member and a second connecting member in spaced relationship connecting together said first and second watercraft;
(g) and connecting means comprising a first connecting member and a second connecting member in spaced relationship connecting together said second and third watercraft;
(h) said two first connecting members allowing relative pitching between said first and second watercraft and between said second and third watercraft and deterring relative yawing between said first and second watercraft and between said second and third watercraft;
(i) and said two second connecting members allowing both relative rolling and pitching between said first and second watercraft and between said second and third watercraft.

39. The method of pushing a first watercraft by a second watercraft which comprises holding the watercraft in tandem, spaced apart, generally aligned relationship and exerting a thrust force on the forward watercraft by the aft watercraft while allowing substantial independent pitching and rolling of the two watercraft caused by wave force without the transmission of appreciable stress between the watercraft which would restrain such independent pitching and rolling, and preventing relative yawing of the watercraft either by wave, tide or wind forces or by steering forces both during travel of the two watercraft along a straight course and during joint turning maneuvers of the two watercraft as a unit.

40. A thrust coupling closely connecting two vessels comprising elongated longitudinally rigid thrust connecting means, first flexing means rigidly attached to one of the vessels and swingable only about a lateral axis, means connecting one portion of said thrust connecting means rigidly to said flexing means and preventing swinging of said thrust connecting means relative to said pivot means about an upright axis, and further means connecting to the other vessel a portion of said thrust connecting means spaced longitudinally from said first flexing means and including second flexing means permitting relative movement of said thrust-connecting means and such other vessel about a lateral axis and means preventing appreciable relative swinging of said thrust connecting means and such other vessel about an upright axis, said thrust connecting means thereby being connected to the two vessels to prevent appreciable relative yawing of the two vessels while permitting independent pitching of the vessels without such pitching creating appreciable bending stress in said thrust connecting means.

41. Connecting mechanism connecting a first watercraft and a second watercraft comprising connecting means connecting together the first and second watercraft and including joint means guiding said connecting means for swinging relative to one of the watercraft about both a vertical axis and a horizontal axis and disengageable means separate from and independent of said joint means but adjacent thereto and connected thereto for disconnection to sever said connecting means without disrupting the structure of said joint means, said disengageable means including a tongue having an opening therein, a support having an opening therein adapted to be placed in registry with the opening in said tongue, and a pin engageable in such registering openings, bridging between said tongue and said support to hold them in predetermined relationship to each other and removable to allow said tongue and said support to separate.

42. The thrust coupling defined in claim 40, in which the further means includes means guiding such other vessel for rolling relative to the thrust connecting means.

43. The connecting mechanism defined in claim 41, and a fluid-actuated cylinder connected to the pin and operable to remove it from the registering openings.

44. The connecting mechanism defined in claim 41, and a lever connected to the pin and having anvil means for receiving a blow to pull the pin out of the registering openings.

References Cited by the Examiner

UNITED STATES PATENTS

| | | | |
|---|---|---|---|
| 612,539 | 10/1898 | Bowick | 114—236 X |
| 1,038,676 | 9/1912 | Stevens | 114—236 |
| 2,693,380 | 11/1954 | Flanagan | 287—130 |
| 2,722,907 | 11/1955 | Dyer | 114—235 |
| 2,965,400 | 12/1960 | Lehman | 287—130 |
| 3,062,170 | 11/1962 | Verneaux | 114—235 |
| 3,125,059 | 3/1964 | Verneaux et al. | 114—235 |

MILTON BUCHLER, *Primary Examiner.*

FERGUS S. MIDDLETON, *Examiner.*

T. M. BLIX, *Assistant Examiner.*